United States Patent Office 3,701,815
Patented Oct. 31, 1972

3,701,815
THERMOPLASTIC SILOXANE-POLYESTER
BLOCK COPOLYMERS
Markus Matzner, Edison, Allen Noshay, East Brunswick, and Robert Barclay, Jr., New Brunswick, N.J., assignors to Union Carbide Corporation, New York, N.Y.
No Drawing. Continuation of abandoned application Ser. No. 792,122, Jan. 17, 1969. This application Jan. 20, 1971, Ser. No. 108,161
Int. Cl. G08g 39/10, 47/10
U.S. Cl. 260—824 R                    10 Claims

ABSTRACT OF THE DISCLOSURE

This invention relates to thermoplastic siloxane-polyester block copolymers having siloxane blocks that are linear and contain dihydrocarbylsiloxane groups and polyester blocks that are linear and contain groups derived from aromatic dicarboxylic acids and diols. The block copolymers of this invention are elastomeric or rigid, depending on their specific composition, even though thermoplastic and have exceptional thermal and oxidative stability. The block copolymers are useful, for example, as molding resins and extruding resins.

---

This application is a continuation of U.S. application, Ser. No. 792,122, filed Jan. 17, 1969, now abandoned.

This invention provides novel thermoplastic siloxane-polyester block copolymers consisting essentially of: (A) at least one linear siloxane block consisting essentially of dihydrocarbylsiloxane groups; and (B) at least one linear polyester block consisting essentially of divalent groups derived from an aromatic dicarboxylic acid by the removal of the hydroxy groups of the carboxy groups and divalent groups derived from a diol by the removal of the hydrogen atoms of the hydroxyl groups, said divalent groups being combined so as to provide ester linkages in the polyester block, said siloxane blocks and polyester blocks being linked by silicon to carbon, silicon to sulfur, silicon to nitrogen or silicon to oxygen to carbon linkages, the average molecular weight of each polyester block being from 500 to 100,000, the average molecular weight of each siloxane block being from 500 to 200,000, the polyester blocks constituting from 10 to 90 weight percent of the block copolymer, the siloxane blocks constituting from 90 to 10 of the weight percent of the block copolymer and the block copolymer having a reduced viscosity of at least 0.3 deciliter per gram when measured in a liquid chloroalkane solution of the block copolymer containing 0.2 gram of the block copolymer per deciliter of the liquid chloroalkane.

A preferred class of the block copolymers of this invention are those of the ABA type wherein each A is a polyester block and B is a siloxane block. This class of block copolymers is represented by the formula:

[R(OOCR'COOR)$_x$][R"(R°$_2$SiO)$_y$R°$_2$SiR"]
[(ROOCR'COO)$_x$R]   (1)

where R is a divalent hydrocarbon group, R' is an arylene group, R" is an oxygen atom, a sulfur atom, —NR'"—, or a divalent organic group attached to the adjacent silicon atom by a carbon to silicon bond, or a carbon to oxygen to silicon bond, R'" is hydrogen or R°, R° is a monovalent hydrocarbon group, x is a positive number, y is a positive number, the average molecular weight of each polyester block —R(OOCR'COOR)$_x$— is from 1,000 to 100,000, the average molecular weight of the siloxane block, R"(R°$_2$SiO)$_y$R°$_2$SiR", is from 500 to 200,000, the polyester blocks constitute from 10 to 90 weight percent of the block copolymer, the siloxane block constitutes from 90 to 10 weight percent of the block copolymer, and the block copolymer has a reduced viscosity of at least 0.3 deciliter per gram when measured in a liquid chloroalkane solution of the block copolymer containing 0.2 gram of the block copolymer per deciliter of the liquid chloroalkane.

Another preferred class of the block copolymers of this invention are those of the (AB)$_n$ type wherein A is a polyester block, B is a siloxane block and n has a value of at least 2. This class of block copolymers is represented by the formula:

[[R(OOCR'COOR)$_x$][R"(R°$_2$SiO)$_y$R°$_2$SiR"]]$_n$   (2)

wherein R is a divalent hydrocarbon group, R' is an arylene group, R" is an oxygen atom, a sulfur atom, —NR'"—, or a divalent organic group attached to the adjacent silicon atom by a carbon to silicon bond, or a carbon to oxygen to silicon bond, R'" is hydrogen or R°, R° is a monovalent hydrocarbon group, x is a positive number, y is a positive number, n has a value of at least 2, the average molecular weight of each polyester block, —R(OOCR'COOR)$_x$—, is from 500 to 30,000, the average molecular weight of the siloxane block, R"(R°$_2$SiO)$_y$R°$_2$SiR"

is from 500 to 50,000, the polyester blocks constitute from 10 to 90 weight percent of the block copolymer, the siloxane blocks constitute from 90 to 10 weight percent of the block copolymer, and the block copolymer has a reduced viscosity of at least 0.3 deciliter per gram when measured in a liquid chloroalkane solution of the block copolymer containing 0.2 gram of the block copolymers per deciliter of the liquid chloroalkane.

The thermoplastic block copolymers of this invention can be elastomeric or rigid. The thermoplastic and elastomeric block copolymers preferably have a tensile modulus from 100 to 10,000 pounds per square inch, a polyester block content from 10 to 50 weight percent and a siloxane block content from 90 to 50 weight percent. The thermoplastic and rigid block copolymers preferably have a tensile modulus from 15,000 to 150,000 pounds per square inch, a polyester block content from 40 to 90 weight percent and a siloxane block content from 60 to 10 weight percent. Such thermoplastic and elastomeric or rigid block copolymers are elastomeric or rigid without being crosslinked.

Illustrative of the divalent hydrocarbon groups represented by R in Formulas 1 and 2 are the above linear and branched alkylene groups (e.g., the methylene, ethylene, 1,2-propylene, 1,3-propylene butylene, and higher polymethylene groups), the arylene groups (e.g., the ortho-, 1,3-propylene, meta- and para-phenylene groups, the 4,4' biphenylene group and the 2,6-naphthylene group), the alkenylene groups (e.g., the —CH=CH—, —CH₂CH=CHCH₂ and

—CH₂CH₂CH=CHCH₃ groups) and the cycloalkylene groups such as:

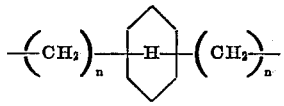

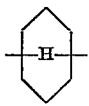

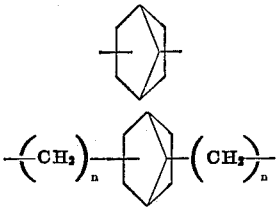

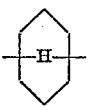

wherein

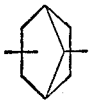

represents the cyclohexylene group,

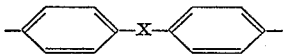

represents a divalent group formed by removing two hydrogens from norbornane and $n$ has a value of at least one. Other divalent linking groups between the blocks are as follows:

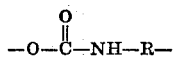

where X is S, SO, SO₂, O, alkylene, alkylidene —S—S—, —N=N—, divalent ester, divalent amide, —N(R''')—, and the like.

Illustrative of the monovalent hydrocarbon groups represented by R° in Formulas 1 and 2 above are the alkyl groups (for example, the methyl, ethyl, n-propyl, isopropyl, n-butyl, sec-butyl, iso-butyl, t-butyl, n-octyl, decyl, dodecyl groups), the cycloalkyl groups (for example, the cyclopropyl, cyclobutyl, cyclopentyl, cyclohexyl, cycloheptyl groups), the alkenyl groups (for example, the vinyl, allyl, crotyl, 3-butenyl, 1,3-butadienyl, allenyl groups), the cycloalkenyl groups (for example, the cyclopentenyl, cyclohexenyl groups), the alkynyl groups (for example, the ethynyl, propargyl groups), the aryl groups (for example, the phenyl, naphthyl, phenanthrenyl anthracenyl groups), the aralkyl groups (for example, the benzyl, 2-phenylethyl, 2-phenyl propyl, cumyl groups), the alkaryl groups (for example, the tolyl, t-butylphenyl, styryl, cyclohexylphenyl groups).

Illustrative of the arylene groups represented by R' in Formulas 1 and 2 above are the arylene groups listed above as illustrating R.

Illustrative of the divalent organic groups represented by R'' in Formulas 1 and 2 above are the following groups:

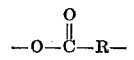

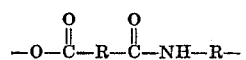

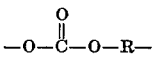

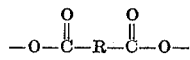

wherein R has the above defined meanings.

In the Formulas 1 and 2 above, the symbols representing the numbers and types of group need not have the same meaning at each occurrence throughout the block copolymer or within a given block. For example, the number of siloxane units in the siloxane blocks (i.e., the value of y) can vary from block to block. As a further example, in a given siloxane block above, some of the R°₂SiO groups can be a dimethylsiloxane group while other of such groups can be methylphenylsiloxane groups.

The block copolymers of this invention can be produced by reacting a polyester having reactive end groups with a siloxane having end groups reactive with the reactive end groups of the polyester. In such reactions, the nature of these reactive groups determines the structure of the divalent group represented by R'' in Formulas 1 and 2. These reactions can be illustrated by the following equations:

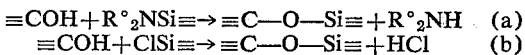
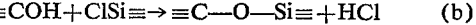
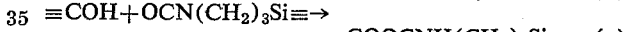
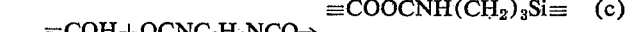
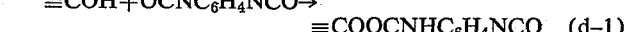
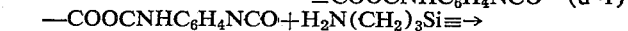
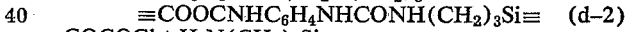
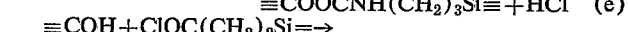
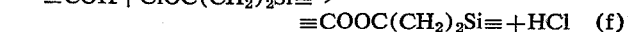
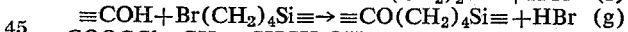

In Equations a through d, f and g, ≡COH represents a terminal alcoholic or phenolic hydroxyl group of the polyester. Such terminal alcoholic hydroxyl groups are present when the polyester is formed by reacting an aromatic dicarboxylic acid (or acid halide) with an excess of a diol. In Equation i through k, the groups on the far left represent a terminal carboxy group of the polyester reactant or a group derived therefrom. Such terminal groups are present when the polyester is formed by reacting a diol with an excess of an aromatic dicarboxylic acid. In Equations a through k, the second group from the left is a terminal reactive group of the siloxane reactant. In Equations e and h, the group on the far left represents a reactive group derived from such hydroxyl groups. In general, the known reaction conditions for effecting the reaction between the reactive group shown in Equations a through k can be used when polyester and siloxane reactants containing such reactive groups ar employed in producing the compositions of this invention. Thus conventional reaction times, temperatures, catalysts and conventional means for removal of byproducts are generally applicable to the production of the block copolymers.

As is apparent to one skilled in the art, the block copolymers of this invention are normally endblocked, polyester and one mole of siloxane gives an A—B—A block copolymer of the following structure:

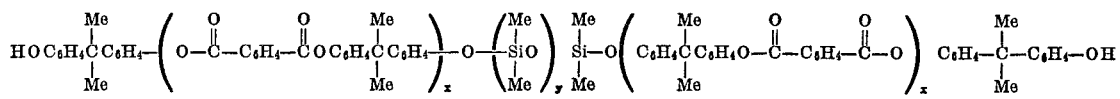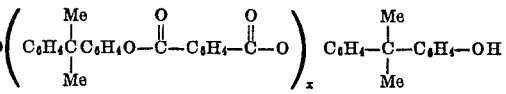

the possibility of cyclic structures being remote. Such endblockers are inconsequential in terms of their amount and effect on the properties and utilities of the block copolymers. Normally such endblockers will be residual reactive groups of the polyester and/or siloxane reactant used to produce the block copolymers. At times, however, it may be desirable to "cap" the block copolymers by converting such reactive groups to less reactive groups (e.g., to convert phenolic or alcoholic hydroxyl groups to ether groups OR°) by known methods. Where a catalyst is used in the production of the block copolymer, the block copolymer may be endblocked by a catalyst residue. Endblocking by impurities is also a possibility.

With particular reference to Equation a, it should be noted that this equation illustrates a process for producing a block copolymer of this invention wherein the siloxane and polyester blocks are linked by oxygen atoms. The process of Equation a comprises: (I) reacting a mixture of (A) a linear bis-(amino) end-blocked siloxane consisting essentially of dihydrocarbylsiloxane groups

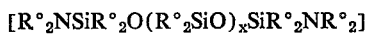

and (B) at least one linear di-hydroxy end-blocked polyester consisting essentially of divalent groups derived from an aromatic dicarboxylic acid by the removal of the hydroxy groups of the carboxy groups and divalent groups derived from a diol by the removal of the hydrogen atoms of the hydroxy groups, said divalent groups being combined so as to provide ester linkages in the polyester. The average molecular weight of the polyester reactant is from 500 to 100,000, the average molecular weight of the siloxane reactant is from 500 to 200,000, the polyester constitutes from 10 to 90 weight percent of the reaction mixture, the siloxane constitutes from 10 to 90 of the weight percent of the reaction mixture. The reaction produces the block copolymer and an amine which are separated (e.g., by volatilizing the amine). The process can be conducted at a temperature of, for example, 50 to 130° C. in a solvent such as trichlorobenzene, dichlorobenzene or monochlorobenzene. The block copolymer can be separated from the solvent by adding a non-solvent such as methanol. The production of a block copolymer have the desired reduced viscosity is assured by exercising precise control of the reaction stoichiometry. This process has proven superior to other processes (e.g., the processes illustrated by Equations b to h above) because the reaction is rapid and facile, the only byproduct is easily removed, non-corrosive gas and the starting materials are easily prepared.

Equation 1 below more specifically illustrates the reaction of Equation a above for the case where a particular block copolymer of this invention is being produced.

wherein the symbols are as defined above.

The polyester reactants useful in producing block copolymers of this invention are known materials that can be produced by conventional methods. Thus the di-hydroxy terminated aromatic polyester reactant can be prepared, for example, by reacting the aromatic dicarboxylic acid chloride with an excess of a bisphenol in refluxing trichlorobenzene as a solvent. Alternatively, such a reactant can be prepared by a low temperature magnesium catalyzed reaction of an aromatic dicarboxylic acid chloride with an excess of a bisphenol or by reaction of an arylester of an aromatic dicarboxylic acid and a bisphenol.

Typical of the aromatic dicarboxylic acids that can be used in producing the polyester reactants that in turn can be used in producing the block copolymers of this invention are phenylene and naphthylene dicarboxylic acids such as terephthalic acid, phthalic acid, isophthalic acid, 4,4'-biphenyldicarboxylic acid, 4,4'-sulfonyldibenzoic acid, 2,6-naphthalenedicarboxylic acid, symmetrical aromatic dicarboxylic acids are preferred.

Typical of the diols that can be used in producing the polyester reactants that in turn can be used in producing the block copolymers of this invention are (a) aliphatic diols such as preferably lower alkylene glycols having from 2 to 6 carbon atoms inclusive such as ethylene glycol 1,3-propane diol, 1,4-butanediol and 1,6-hexanediol and aromatic diols including phenylene diols such as hydroquinone, resorcinol, catechol;

(b) Bis-(hydroxyphenyl)alkanes such as 2,2-bis-(4-hydroxyphenyl)propane,
2,4'-dihydroxydiphenyl-methane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane
and the like;

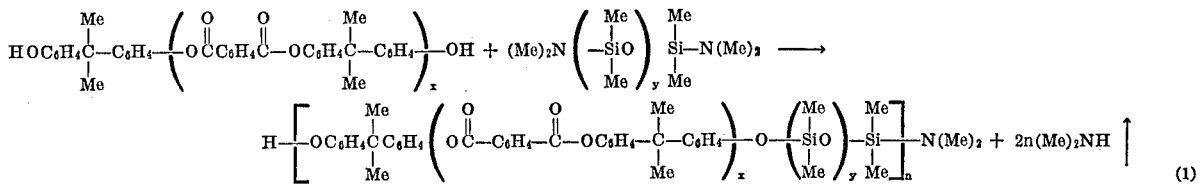

wherein $C_6H_4$ is a phenylene group, Me is a methyl group and $x$, $y$ and $n$ have the above defined meanings.

Equation 1 illustrates the preparation of an $(A-B)_n$ block copolymer from one mole of polyester reactant and one mole of siloxane reactant. The use of two moles of (c) Di(hydroxyphenyl)sulfones such as bis-(4-hydroxyphenyl) sulfone, 2,4'-dihydroxydiphenyl sulfone, 5'-chloro-2,4'-dihydroxydiphenyl sulfone, 5'chloro-4,4'-dihydroxydiphenyl sulfone, and the like;

(d) Di(hydroxyphenyl)ethers such as bis-(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3 isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy 3-chloronaphthyl)ether,
4,4'-dihydroxy-3,6-dimethoxydiphenyl ether,
4,4'-dihydroxy-2,5-diethoxydiphenyl ether and the like materials.

The siloxane reactants used to produce the block copolymers of this invention are known materials that can be produced by conventional methods. For example, a siloxane reactant can be prepared by equilibrating a mixture containing dimethylsiloxane cyclic tetramer, $$Me_2N(Me_2SiO)_4Me_2SiNMe_2$$

and a catalytic amount of tetramethyl ammonium silanolate and then neutralizing the catalyst.

The compositions of this invention containing silicon-bonded alkenyl groups can be polymerized or cured via such groups using known processes (e.g., heat and free radical catalysts). By way of illustration, a thermoplastic block copolymer as above defined wherein from 0.1 to 3.0 mol percent of the silicon-bonded monovalent hydrocarbon groups (R° in Formulas 1 and 2) are alkenyl groups can be cured by heating at a temperature from 100° C. to 300° C. in the presence of a catalytic amount (from 0.1 to 5.0 weight percent based on the weight of the block copolymer) of a peroxide catalyst (e.g., an aryl peroxide such an benzoyl peroxide or an alkyl peroxide such as di-tertiary butyl peroxide) to produce a thermoset product. Such thermoset products are useful as coating resins or elastomers.

On the other hand, it is sometimes desirable that the block copolymers of this invention (and so the groups represented by R, R° and R'' in Formulas 1 and 2, above) be free of aliphatic carbon to carbon multiple bonds (i.e., free of olefinic and acetylenic unsaturation). Freedom from such unsaturated bonds may be desirable where it is desired to minimize changes in the physical properties of the block copolymers when exposed to conditions under which unsaturated bonds tend to react.

The block copolymers of this invention can contain small amounts of other groups and blocks in addition to those specifically set out therein above. Thus the siloxane block can contain any of a wide variety of other well known difunctional siloxane groups (e.g., nitroaryl(alkyl)siloxane, haloalkyl(alkyl)siloxane, fluoroalkyl(alkyl)siloxane, cyanoalkyl(hydrogen)siloxane, and carbalkoxyalkyl(phenyl)siloxane groups and the like. Similarly, small amounts of other difunctional organic groups can be present in the polyester blocks.

The block copolymers of this invention are mixtures of various block copolymer species due to the fact that the polymeric reactants used to produce the block copolymers of this invention are themselves mixtures.

The siloxane blocks in the block copolymers of this invention are amorphous and the polyester blocks, particularly those derived from alkylene glycols, are crystalline. The crystallinity of the polyester blocks imparts solvent resistance properties to the block copolymers. The block copolymers wherein the diol residues in the polyester blocks are derived from alkylene glycol crystallize more rapidly and have a higher degree of crystallinity (and so greater solvent resistance) than block copolymers wherein the diol residues are derived from arylene diols. The latter block copolymers may require further treatment after production (e.g., annealing by heat) to develop maximum crystallinity in the polyester blocks. The block copolymers exhibit glass transition temperatures and melting points attributable to the amorphous and crystalline blocks.

The block copolymer produced from alkylene glycols (e.g., those represented by Formulas 1 and 2 wherein R is an alkylene group) have excellent solvent resistance.

The block copolymers of this invention are useful in a variety of areas wherein their desirable properties can be used to advantage. The thermoplastic block copolymers are generally useful as molding and extruding resins. The thermoplastic and elastomeric block copolymers of this invention are useful as fibers, packaging films, gasketing and electrical and thermal insulation. The thermoplastic and rigid block copolymers of this invention are useful as protective coatings.

The block copolymers of this invention possess desirable properties which make them especially useful in the above areas of application. Most notably, the block copolymers are useful at low temperatures, in view of the fact that they have low glass transition temperatures (e.g., below —100° C.). The block copolymers produced from dihydric phenols (e.g., those represented by Formulas 1 and 2 wherein R is an arylene group) have exceptionally high melting points (e.g., above +260° C.). The block copolymer produced from alkylene glycols (e.g., those represented by Formulas 1 and 2 wherein R is an alkylene group) have excellent solvent resistance. The block copolymers, even those wherein the polyester block is linked to silicon by an oxygen atom, are hydrolytically stable. The block copolymers are remarkably stable to oxidation, ultraviolet light and heat. In addition, the block copolymers do not require curing or vulcanization to be useful as elastomers or rigid resins.

The thermoelastic properties of the block copolymers of this invention are due to the critical chemical composition of the blocks, the critical molecular weights of the blocks, the critical relative amounts of the blocks, and the critical molecular weight of the copolymer (defined herein in terms of the reduced viscosities of the copolymers).

The reduced viscosities (RVs) of the block copolymers of the following examples were measured by the following technique: Reduced viscosity (RV) is determined by dissolving a 0.2 gram sample of the block copolymer in a chloroalkane (preferably s-tetrachloroethane or dichloromethane) in a 100 milliliter volumetric flask so that the volume of the resultant solution is exactly 100 milliliters. The viscosity of the solution, after filtration through a sintered glass funnel, is determined in Cannon-Fenske viscometer at 25° C. Reduced viscosity values are obtained from the equation:

$$\text{Reduced viscosity} = \frac{t_s - t_o}{(c) \times (t_o)}$$

wherein:

$t_o$ is the efflux time of the pure solvent
$t_s$ is the efflux time of the block copolymer solution
$c$ is the concentration of the block copolymer solution expressed in terms of grams of block copolymer per 100 ml. of solution.

The term "hydrocarbyl" is used herein to denote a monovalent hydrocarbon group. The term "silicone" and "siloxane" are used herein as equivalents. The term "diol" is used herein to denote any organic compound having two alcoholic hydroxyl groups or two phenolic hydroxyl groups. The phrase "molecular weight" is used to denote number average molecular weight.

The following examples illustrate the present invention. In the examples appearing below, the indicated abbreviations have the indicated meanings:

| Abbreviations | Meanings |
|---|---|
| Bisphenol A |  p-HOC$_6$H$_4$—C(Me)(Me)—C$_6$H$_4$OH-p |
| RV | Reduced viscosity. |
| $\overline{M}n$ | Number average molecular weight. |
| P.s.i. | Pounds per square inch. |
| Tg | Glass transition temperature (Tg), commonly referred to as the second order phase transition temperature, refers to the inflection temperatures found by plotting the resilience (recovery from one percent elongation) of a film ranging in thickness from 3 to 15 mils against the temperature. See Brown, "Textile Research Journal," 25, 891 (1955). |
| T$_2$ | Temperatures at which the tensile modulus is 100 p.s.i. |
| M.W. | Molecular weight. |
| 100% modulus | Stress (force per unit area of original cross section) required to extend a test sample 100%. |
| 300% modulus | Stress required to extend the sample 300%. |
| Me | Methyl. |
| Morton flask | A flask creased, usually in 4 places, to improve mixing. |
| Drierite | A drying agent consisting essentially of anhydrous calcium sulfate. It is coated with a blue cobalt salt which forms a pink complex with water and a violet complex with dimethyl amine. |
| Ml | Milliliters. |
| Min | Minutes. |
| Dl | Deciliter. |
| G. or gm | Gram. |

In the following examples, the block copolymers were produced by the reaction illustrated by Equation a above.

EXAMPLE 1

Preparation of Bisphenol A isophthalate-silicone block copolymer

The synthesis was carried out in a two-step, one-pot (one-reaction vessel) reaction. The hydroxyl-terminated polyester oligomer was synthesized in the first step by reacting isophthaloyl chloride with a 10 mole percent excess of bisphenol A in refluxing trichlorobenzene. In the second step, the block copolymer was prepared by adding the bis(dimethylamine)-terminated polydimethylsiloxane oligomer to the polyester oligomer reaction solution to form the block copolymer.

Materials (1) Bisphenol A (dried at 80° C. overnight in vacuo) 25.08 gm. (0.110 mole)
(2) Isophthaloyl chloride (recrystallized from petroleum ether and dried at room temperature overnight in vacuo) 20.30 g. (0.100 mole)
(3) 1,2,4-trichlorobenzene (distilled) 500 ml.
(4) Bis(dimethylamine) terminated polydimethylsiloxane oligomer

[Me$_2$NSiMe$_2$O(SiMe$_2$O)$_x$SiMe$_2$NMe$_2$]

(a) 56.2 ml. (54.0 gms.; 0.0100 mole at $\overline{M}n$=5400)
(b) 7.8 ml. (7.5 gms.; 0.0014 mole at $\overline{M}n$=5400)

Apparatus

One liter, 4-neck Morton flask, equipped with a mechanical stirrer, a thermometer, a temperature controller, a nitrogen sparge tube, a 3-way stopcock, a condenser fitted with a drying tube and a heating mantle.

Procedure

Step 1: The apparatus was dried by heating and flushing with dry nitrogen (flushing was continued throughout the entire reaction). Materials (1), (2) and (3) were charged to the reactor, resulting in a heterogeneous mixture. Upon heating to 100° C., the mixture became homogeneous. Heating was continued. A portion of the trichlorobenzene solvent (100 ml.) was distilled out of the reactor in order to dehydrate the contents. Thirty minutes was required to heat up to the distillation temperature (209° C.) and an additional 45 minutes was required for the distillation. Evolution of HCl was observed during the distillation. Heating at the reflux temperature was continued for 6.5 hours. At the end of this time HCl evolution had ceased. The reaction solution was clear, slightly yellow, and slightly viscous. The solution was cooled to room temperature and was allowed to stand overnight under a sparge of dry nitrogen. Based on the stoichiometry and yield of the reaction, the $\overline{M}n$ of the polyester so produced was about 3,000.

Step 2: The reaction was continued the next day. The polyester oligomer solution produced as described in Step 1 above was heated to, and maintained at, 150° C. A total of 56.2 ml. of the polydimethylsiloxane oligomer (4a) was added in 3 portions: 27.5 ml.; 14.5 ml. 45 min. later; 14.0 ml. 60 min. later. The viscosity of the solution increased only slightly during this time. The reaction mixture was cooled to room temperature and allowed to stand overnight under a sparge of dry nitrogen. The next day, approximately half of the reaction solution was withdrawn from the flask and coagulated with 10 volumes of methanol to give a white fluffy precipitate (Sample A). This was slurried with fresh methanol, filtered and dried overnight in vacuo at 60° C. Reaction of the second portion of the reaction solution, still in the dry reaction flask, was continued at a temperature of 130° C. A total of 7.8 ml. (4b) was added in six 1.3 ml. portions at 30 min. intervals. During this time, the viscosity of the reaction solution increased to a very high level, indicating that insufficient siloxane oligomer had been used in the preparation of Sample A, i.e., that the stoichiometric point had not yet been reached. After heating for an additional hour (after the last siloxane addition) the reaction solution (Sample C) was isolated as described above for Sample A. The data obtained on these two samples are as follows:

| Sample: | Yield, grams | Weight percent siloxane | R.V. (0.2 gm./dl. in CH$_2$Cl$_2$ at 25° C. |
|---|---|---|---|
| A | 35.4 | 58.6 | 0.40 |
| C | 51.5 | 64.6 | 0.64 |
| Total | [1] 87.1 | | |

[1] (88.2%).

EXAMPLE 2

(A) Preparation of a hydroxyl-terminated poly(bisphenol A terephthalate)

This intermediate was prepared by the reaction of terephthaloyl chloride (0.700 mole) with bisphenol A (0.806 mole) under conditions suitable for preparing high molecular weight poly(bisphenol A terephthalate). The theoretical $\overline{M}n$ was 2595. The reduced viscosity, measured in p-chlorophenol at 49° C., was 0.25. The actual $\overline{M}n$ was about 2800.

(B) Preparation of a block copolymer of Bisphenol A terephthalate (36 wt. percent) and dimethyl siloxane (64 wt. percent)

In a 500 ml. Morton flask equipped with a stirrer, a thermometer, an inlet for dry argon gas, a dropping funnel, and means for either removing distillate or returning reflux were placed 10.0 g. (about 3.6 millimoles) of the bisphenol A terephthalate oligomer produced as described in A above and 375 ml. of orthodichlorobenzene. This mixture was heated to 180° C., the oligomer gradually dissolving, and about 150 ml. of o-dichlorobenzene was removed by distillation. Heating was then continued under reflux. To this solution was added 13 ml. (2.7 millimoles) of a bis(dimethylamino)polydimethylsiloxane, $\overline{M}n$ 4580. When the evolution of dimethylamine had ceased, after about 1 hour, 2 ml. (0.4 millimole) of the same siloxane was added; additional 2 ml. portions were added after 38 minutes and 23 minutes. No dimethylamine was evolved after the fourth portion of siloxane, which is believed to have been in excess. Reaction was allowed to continue for an additional 34 minutes. The block copolymer so produced was then coagulated by adding the hot solution to a total of about 5 liters of methanol in a Waring Blendor. The block copolymer was washed in the blender with two portions of methanol and dried overnight in a vacuum oven at about 70° C. The yield of block copolymer of this invention, which had a reduced viscosity (in s-tetrachloroethane at 25° C., concentration 0.2 g./100 ml.) 0.59, was 23.04 g. (82%).

The composition and properties of the block copolymers of this invention produced as described in Examples 1 and 2 above are tabulated in Table 1 below.

TABLE 1.—PROPERTIES OF BLOCK COPOLYMERS

| | Block copolymer C of Ex. 1 [a] | Block copolymer of Ex. 2 [b] |
|---|---|---|
| Polyester block $M_n$ | 3,000 | ca. 2,800 |
| Silicone block $M_n$ | 5,400 | 4,580 |
| Weight percent silicone | 64.6 | ca. 64 |
| Block copolymer R.V. | [c] 0.64 | [d] 0.59 |
| Tensile modulus, p.s.i. | 2,900 | 12,000 |
| 100% modulus, p.s.i. | 900 | 1,300 |
| 300% modulus, p.s.i. | 1,500 | |
| Tensile strength, p.s.i. | 1,800 | 1,325 |
| Elongation at break, percent | 475 | 115 |
| $T_g$ ° C. [e] | −125 | |
| $T_g$ ° C. [f] | +120 | +130–135 |
| $T_2$ ° C. [f] | +260 | +295 |

[a] Film cast from $CHCl_3$ solution.
[b] Film cast from $C_2H_2Cl_4$ solution.
[c] R.V. determined in $CH_2Cl_2$ (0.2 g./dl. at 25° C.).
[d] R.V. determined in $C_2H_2Cl_4$ (0.2 g./dl. at 25° C.).
[e] Due to siloxane block.
[f] Due to polyester block.

EXAMPLE 3

Preparation of a block copolymer of hexamethylene terephthalate (37 wt. percent) and dimethylsiloxane (63 wt. percent)

Step 1: In a 250 ml., three-necked flask equipped with a magnetic stirrer, a thermometer, an inlet for dry argon gas, a small dropping funnel, and a reflux condenser with Drierite tube connected to a trap containing pellets of potassium hydroxide were placed 4.0501 g. (34.27 millimoles) of 1,6-hexanediol, 6.4050 g. (31.55 millimoles) of terephthaloyl chloride, and 180 ml. of chlorobenzene. This mixture was heated under reflux for 17 hours, after which time no hydrogen chloride was being evolved. The resulting hydroxyl-terminated polyester, theoretical molecular weight 3000, was not isolated from solution.

Step 2: The polyester solution produced in Step 1 was cooled to about 120° C. To it was added, over a period of about 2 minutes, 13 ml. (2.7 millimoles) of a bis(dimethylamino) end blocked poly(dimethylsiloxane), molecular weight 4680. The evolution of dimethylamine was observed quickly, first by testing with pH paper and then by formation of a deep violet color in the Drierite. After about 3.7 hours at 120±2° C. evolution of dimethylamine had stopped, and an additional 2 ml. (0.4 millimole) of the silicone oligomer was added. There was little further sign of reaction, and heating was ended after an additional 1.7 hours. A white, fibrous block copolymer of this invention was precipitated by adding the cooled solution to 800 ml. of methanol in a Waring Blendor. The block copolymer was washed with three 500 ml. portions of methanol and dried in a vacuum oven at 70° C. The yield of the block copolymer was 19.4 g. (87%), reduced viscosity (0.2 g./100 ml. in chloroform at 25° C.) 0.47.

A film was cast from solution of the block copolymer in chloroform. The properties of the film tabulated below were measured:

Tensile modulus, p.s.i. _____ 900
Modulus at 100% extension, p.s.i. _____ 420
Tensile strength, p.s.i. _____ 490
Elongation at break, percent _____ 150
$T_2$ (melting point), ° C. _____ 120

What is claimed is:

1. A thermoplastic siloxane-polyester block copolymer consisting essentially of: (A) at least one linear siloxane block consisting essentially of dihydrocarbylsiloxane groups; and (B) at least one linear polyester block consisting essentially of divalent groups derived from an aromatic dicarboxylic acid by the removal of the hydroxy groups of the carboxy groups and divalent groups derived from a diol by the removal of the hydrogen atoms of the hydroxy groups, said divalent groups being combined so as to provide ester linkages in the polyester block, said siloxane blocks and polyester blocks being linked by silicon to carbon, silicon to sulfur, silicon to nitrogen or silicon to oxygen to carbon linkages, the number average molecular weight of each polyester block being from 2,800 to 100,000, the number average molecular weight of each siloxane block being from 4,580 to 200,000, the polyester blocks constituting from 10 to 90 weight percent of the block copolymer, the siloxane blocks constituting from 90 to 10 of the weight percent of the block copolymer and the block copolymer having a reduced viscosity of at least 0.3 deciliter per gram measured in a liquid chloroalkane solution of the block copolymer containing 0.2 gram of the block copolymer per deciliter of the liquid chloroalkane.

2. A thermoplastic siloxane-polyester block copolymer as defined in claim 1, represented by the average formula:

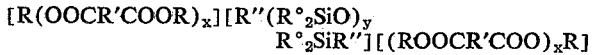

$[R(OOCR'COOR)_x][R''(R°_2SiO)_y R°_2SiR''][(ROOCR'COO)_xR]$ wherein R is a divalent hydrocarbon group, R' is an arylene group, R'' is an oxygen atom, a sulfur atom, —NR'''—, or a divalent organic group attached to the adjacent silicon atom by a carbon to silicon bond or a carbon to oxygen to silicon bond, R''' is hydrogen or R°, R° is a monovalent hydrocarbon group, x is a positive number, y is a positive number, the number average molecular weight of each polyester block,

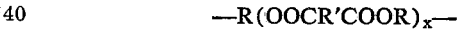

—$R(OOCR'COOR)_x$— is from 2,800 to 100,000, the number average molecular weight of the siloxane block,

$R''(R°_2SiO)_y R°_2SiR''$ is from 4,580 to 200,000, the polyester blocks constitute from 10 to 90 weight percent of the block copolymer, the siloxane block constitutes from 90 to 10 weight percent of the block copolymer, and the block copolymer has a reduced viscosity of at least 0.3 deciliter per gram measured on a liquid chloroalkane solution of the block copolymer containing 0.2 gram of the block copolymer per deciliter of the liquid chloroalkane.

3. A thermoplastic siloxane-polyester block copolymer as defined in claim 1, represented by the average formula:

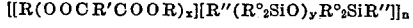

$[[R(OOCR'COOR)_x][R''(R°_2SiO)_y R°_2SiR'']]_n$ wherein R is a divalent hydrocarbon group, R' is an arylene group, R'' is an oxygen atom, a sulfur atom,

—NR'''— or a divalent organic group attached to the adjacent silicon atom by a carbon to silicon bond or a silicon to oxygen to carbon bond, R''' is hydrogen or R°, R° is a monovalent hydrocarbon group, x is a positive number, y is a positive number, n has a value at least 2, the number average molecular weight of each polyester block,

—$R(OOCR'COOR)_x$— is from 2,800 to 30,000, the number average molecular weight of each siloxane block,

$R''(R°_2SiO)_y R°_2SiR''$ is from 4,580 to 50,000, the polyester blocks constitute from 10 to 90 weight percent of the block copolymer, the siloxane blocks constitute from 90 to 10 weight percent of the block copolymer, and the block copolymer has a reduced viscosity of at least 0.3 deciliter per gram measured on a liquid chloroalkane solution of the block copolymer per deciliter of the liquid chloroalkane.

4. A block copolymer as defined in claim 1 wherein the aromatic dicarboxylic acid is a phenylene dicarboxylic acid.

5. A block copolymer as defined in claim 1 wherein the diol is bis-(hydroxyphenyl)alkane.

6. A block copolymer as defined in claim 1 wherein the diol is a lower alkylene glycol having from 2 to 6 carbon atoms inclusive.

7. A block copolymer as defined in claim 1 free of aliphatic carbon to carbon multiple bonds.

8. A block copolymer as defined in claim 1, wherein from 0.1 to 3.0 mol percent of the monovalent hydrocarbon groups represented by R° are alkenyl groups.

9. A thermoset composition produced by curing the block copolymer of claim 8 in the presence of a cure catalyst for the alkenyl groups.

10. A thermoplastic siloxane-polyester block copolymer consisting essentially of (A) linear siloxane blocks consisting of polydimethyl siloxane groups; and (B) linear polyester blocks consisting of bisphenol A terephthalate groups said siloxane blocks and polyester blocks being linked by a silicon to oxygen to carbon linkage, number average molecular weight of each polyester block is about 2,800, wherein the number average molecular weight of each siloxane block is 4,580, the polyester blocks constituting 36 weight percent of the block copolymer, the siloxane blocks constituting about 64 weight percent of the block copolymer and wherein the block copolymer has a reduced viscosity of 0.59 deciliter per gram measured at 25° C. in a liquid s-tetrachloroethane solution of the block copolymer containing 0.2 gram of the block copolymer per deciliter of the liquid s-tetrachloroethane.

References Cited

Vinogradova et al.: Chemical Abstracts, vol. 65 (1966), col. 4036b.

SAMUEL H. BLECH, Primary Examiner

U.S. Cl. X.R.

117—161 ZA; 260—33.8 SB, 47 C, 75 R, 75 SB

PO-1050
(5/69)

UNITED STATES PATENT OFFICE
CERTIFICATE OF CORRECTION

Patent No. 3,701,815            Dated October 31, 1972

Inventor(s) M. Matzner et al

It is certified that error appears in the above-identified patent and that said Letters Patent are hereby corrected as shown below:

Claim 3, last line after the term "copolymer" insert the phrase ---containing 0.2 gram of the block copolymer---.

Signed and sealed this 3rd day of April 1973.

(SEAL)
Attest:

EDWARD M. FLETCHER, JR.            ROBERT GOTTSCHALK
Attesting Officer                  Commissioner of Patents